Figure 1:
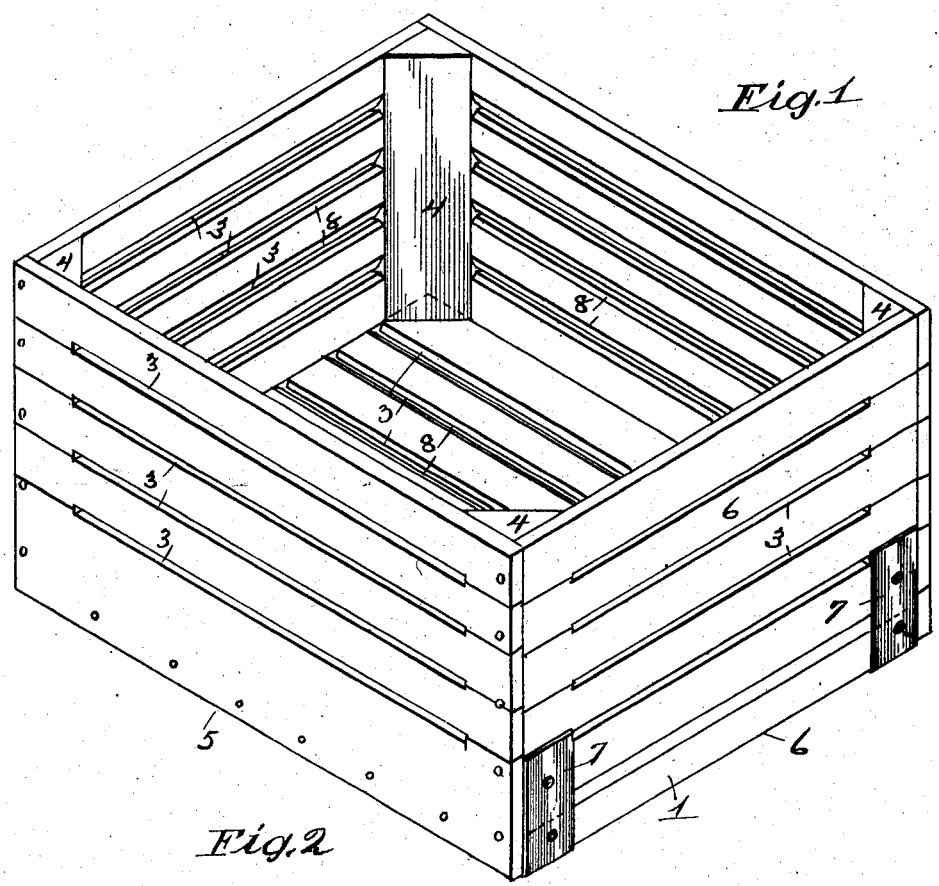

No. 737,259. PATENTED AUG. 25, 1903.
C. E. & J. O. MANSFIELD.
FRUIT OR VEGETABLE CRATE.
APPLICATION FILED OCT. 10, 1902.
NO MODEL. 2 SHEETS—SHEET 1.

Witnesses.
R. Zbornik
Percy E. Neville

Inventors
Cassius E. Mansfield
John O. Mansfield
By Wm. M. Monroe
Attorney

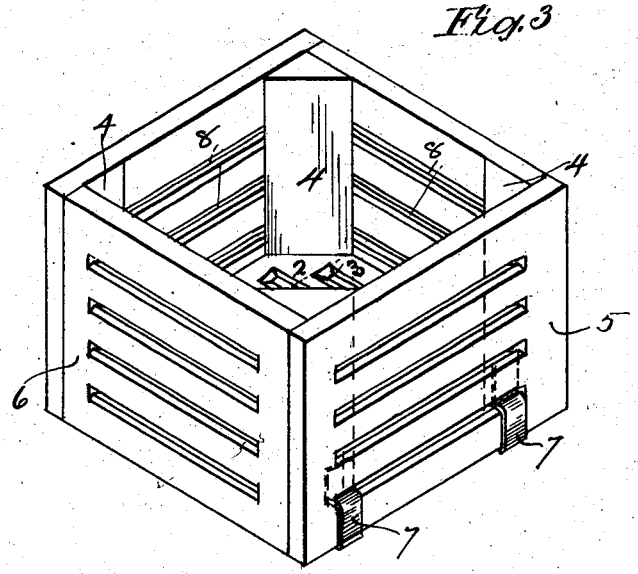

No. 737,259. Patented August 25, 1903.

UNITED STATES PATENT OFFICE.

CASSIUS E. MANSFIELD, OF RAVENNA, MICHIGAN, AND JOHN O. MANSFIELD, OF CLEVELAND, OHIO.

FRUIT OR VEGETABLE CRATE.

SPECIFICATION forming part of Letters Patent No. 737,259, dated August 25, 1903.

Application filed October 10, 1902. Serial No. 126,663. (No model.)

*To all whom it may concern:*

Be it known that we, CASSIUS E. MANSFIELD, a resident of Ravenna, county of Muskegon, State of Michigan, and JOHN O. MANSFIELD, a resident of Cleveland, county of Cuyahoga, State of Ohio, citizens of the United States, have invented jointly certain new and useful Improvements in Fruit and Vegetable Crates, of which we hereby declare the following to be a full, clear, and exact description, such as will enable others skilled in the art to which it appertains to make and use the same.

Our invention relates to improvements in shipping-crates; and the objects of the invention are to provide a partially knockdown crate which is adapted for shipping fruit or vegetables which will be strong and serviceable, will not injure delicate fruit, and is ventilating in construction.

Our invention consists in a rectangular base portion formed of terminal bars upon which transverse slats are nailed and sufficiently separated to provide for ventilation. Upon the bottom portion are raised the sides which are secured to corner vertical posts, and the ends are then secured to the sides by nailing. The sides and ends are also provided with ventilating-openings.

Our invention is hereinafter further described, shown in the drawings accompanying, and specifically pointed out in the claims.

Figure 2:
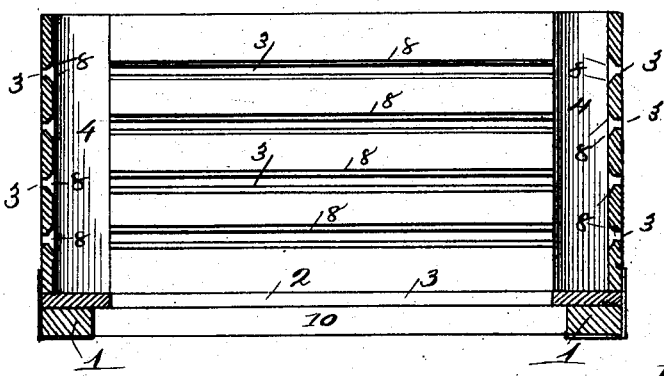

In the accompanying drawings, Figure 1 shows a perspective view of the device after it is put together. Fig. 2 is a longitudinal vertical section of the same. Fig. 3 is a perspective view of preferred form of the device.

In the views, 1 represents the bars which terminate the rectangular bottom. On these are secured by nails the ventilated bottom 2, which may consist of one board, slotted at 3 to provide ventilation for the contents.

The corner-posts 4 are triangular in section, having one edge rectangular, the sides and ends being nailed to the adjacent sides of the rectangle, thus presenting the longer side to the interior of the crate, which gives a smooth face for the contents of the crate to make contact with. The sides 5, having the corner-posts 4 attached, are first raised into position and the ends 6 are nailed to the posts. The bottom is then securely attached by means of metal strips 7, which are nailed or otherwise secured to the bars 1 and to the corner-posts 4 through the slats or siding. The sides, ventilated bottom 2, and ends may also each be formed in one piece slotted for ventilation, as indicated in Fig. 3.

In order to prevent the sharp edges of the slats from injuring the perishable contents of the crate, they are beveled on the inner side, as at 8, where they would be apt to make contact therewith, thus forming substantially Y-shaped slots between the slats.

The parts can be laid one over the other to form a suitable package for shipment and finally put together to inclose the fruit or vegetables.

This device is simple, serviceable, and of slight initial cost.

The bottom portions are formed with an air-space 10 below, between the terminal bars, so that one crate can be placed above another in shipping perishable goods and there will be free access of air between them to preserve the contents and prevent crushing.

Having described our invention, what we claim as new, and desire to secure by Letters Patent, is—

1. In a crate, the combination with a bottom comprising a rectangular frame, of a ventilating false bottom resting on the first-named bottom, a crate-body having ventilating-walls, metallic cleats engaging the outside of the body and having bent portions so as to clamp the false bottom between the said rectangular bottom and the crate-body, and triangular corner-posts secured in the corners of the body and bearing on the false bottom, substantially as described.

2. In a crate, the combination with a bottom, of a false bottom resting thereon, a crate-body comprising sides and ends, and means for securing the bottoms, sides and ends together, the false bottom, sides and ends having slots substantially Y-shaped in cross-section.

In testimony whereof we hereby set our hands this 18th day of September, 1902.

CASSIUS E. MANSFIELD.
JOHN O. MANSFIELD.

Witnesses:
WM. M. MONROE,
A. H. GEBERT.